United States Patent
Siegel et al.

(10) Patent No.: US 11,023,862 B2
(45) Date of Patent: *Jun. 1, 2021

(54) SYSTEM AND METHOD OF MANAGING MEETING INVITATIONS

(71) Applicant: AT&T Intellectual Property I, L.P., Atlanta, GA (US)

(72) Inventors: Steven A. Siegel, Mendham, NJ (US); Richard R. Erickson, Farmingdale, NJ (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/058,203

(22) Filed: Aug. 8, 2018

(65) Prior Publication Data

US 2018/0349860 A1 Dec. 6, 2018

Related U.S. Application Data

(63) Continuation of application No. 13/674,206, filed on Nov. 12, 2012, now Pat. No. 10,074,078.

(51) Int. Cl.
*G06Q 10/10* (2012.01)
*H04L 12/18* (2006.01)

(52) U.S. Cl.
CPC ....... *G06Q 10/1095* (2013.01); *G06Q 10/107* (2013.01); *G06Q 10/109* (2013.01); *H04L 12/1818* (2013.01)

(58) Field of Classification Search
CPC .. G06Q 10/1095; G06Q 10/109; G06Q 10/10; G06Q 10/02; G06Q 10/107; G06Q 10/1093; G06Q 10/063116; G06Q 10/06312; G06Q 10/06; G06Q 10/06314; G06Q 10/06313; G06Q 10/103; H04L 12/1818; H04L 65/403; H04L 67/02; H04L 67/22; H04L 51/08; G06F 9/542; H04W 4/029; H04W 4/02; H04W 4/025;

(Continued)

(56) References Cited

U.S. PATENT DOCUMENTS 5,493,692 A * 2/1996 Theimer .............. G06Q 10/107
340/5.74
6,167,379 A * 12/2000 Dean ................... G06Q 10/109
705/7.18

(Continued)

*Primary Examiner* — Aftab N. Khan
*Assistant Examiner* — Rachel J Hackenberg
(74) *Attorney, Agent, or Firm* — Guntin & Gust, PLC; Dana Lemoine

(57) ABSTRACT

A method includes receiving, at a messaging server from a first device associated with a first user, an update message to change a meeting from a first time to a second time. The message is directed to a second user. The method also includes, without receipt of a response to the update message from a device associated with the second user and in response to a current time being less than a particular time from the second time, selecting a set of devices associated with the second user and sending an alert regarding the meeting from the messaging server to each device of the set of devices. The set of devices identify devices that satisfy a device capability needed to participate in the meeting and that are currently available for use.

20 Claims, 7 Drawing Sheets

(58) Field of Classification Search
CPC ......... H04W 4/21; H04N 7/157; H04N 7/155; H04M 3/562; H04M 3/565; H04M 7/0027

See application file for complete search history.

(56) References Cited

U.S. PATENT DOCUMENTS

| | | | |
|---|---|---|---|
| 6,760,423 B1 | 7/2004 | Todd | |
| 7,054,918 B2* | 5/2006 | Polcyn | H04Q 3/62 379/209.01 |
| 7,107,312 B2* | 9/2006 | Hackbarth | G06Q 10/107 709/204 |
| 7,113,797 B2* | 9/2006 | Kelley | H04W 4/029 455/456.2 |
| 7,155,477 B2* | 12/2006 | Blair | H04L 29/06 709/203 |
| 7,171,191 B2 | 1/2007 | Olson | |
| 7,283,970 B2* | 10/2007 | Cragun | G06Q 10/109 705/7.19 |
| 7,483,525 B2 | 1/2009 | Chaddha et al. | |
| 7,496,630 B2* | 2/2009 | Arellano | H04L 51/04 709/206 |
| 7,869,941 B2* | 1/2011 | Coughlin | G06Q 10/1093 701/533 |
| 7,889,851 B2 | 2/2011 | Shah et al. | |
| 8,027,447 B2 | 9/2011 | Sylvain | |
| 8,131,281 B1 | 3/2012 | Hildner et al. | |
| 8,180,663 B2* | 5/2012 | Tischhauser | G06Q 10/1095 705/7.19 |
| 8,194,837 B1 | 6/2012 | Weinman | |
| 8,638,923 B1* | 1/2014 | Zhang | H04M 3/42212 379/211.02 |
| 8,823,507 B1 | 9/2014 | Touloumtzis | |
| 2006/0235994 A1 | 10/2006 | Wu | |
| 2007/0253424 A1 | 11/2007 | Herot et al. | |
| 2008/0205616 A1 | 8/2008 | Teng et al. | |
| 2009/0013045 A1* | 1/2009 | Maes | G06Q 10/10 709/205 |
| 2009/0259674 A1* | 10/2009 | Griffin | G06Q 10/109 |
| 2010/0070601 A1 | 3/2010 | Aaron et al. | |
| 2010/0211425 A1 | 8/2010 | Govindarajan | |
| 2010/0312831 A1 | 12/2010 | Xie et al. | |
| 2011/0231216 A1* | 9/2011 | Fyke | G06Q 10/0631 705/7.12 |
| 2011/0295642 A1 | 12/2011 | MacFarlane et al. | |
| 2012/0150956 A1 | 6/2012 | Tucker et al. | |
| 2012/0269335 A1 | 10/2012 | Goguen et al. | |
| 2012/0303834 A1 | 11/2012 | Adam et al. | |
| 2012/0311045 A1* | 12/2012 | Sylvain | H04L 51/12 709/206 |
| 2013/0117372 A1 | 5/2013 | Digate et al. | |
| 2013/0218971 A1 | 8/2013 | Sasaki et al. | |
| 2013/0339436 A1* | 12/2013 | Gray | H04L 51/24 709/204 |
| 2013/0339498 A1 | 12/2013 | Johnson | |
| 2014/0013231 A1 | 1/2014 | Comertoglu et al. | |
| 2014/0047001 A1 | 2/2014 | Phillips et al. | |

* cited by examiner

Meeting Request 302

| Subject | Video Conference |
|---|---|
| Time | Wednesday May 16, 2012 11:00 AM – 11:35 AM |
| From | Alvina Gizzi |
| Other Invitees | Keith Inez, Amy Li, Christal Salmi, John Smith |
| Meeting URL | https://onlinemeeting.com/gizzi/ADW1247 |

[Ignore] 312  [Decline] 314  [Accept] 316

SYSTEM AND METHOD OF MANAGING MEETING INVITATIONS

PRIORITY CLAIM

This application claims priority from, and is a continuation of, U.S. patent application Ser. No. 13/674,206, filed Nov. 12, 2012, which is incorporated herein by reference in its entirety.

FIELD OF THE DISCLOSURE

The present disclosure is generally related to managing meeting invitations.

BACKGROUND

Web-based, real-time communication sessions may be initiated by an entity that invites others to join the communication sessions. Invitations to such sessions may be sent directly or indirectly. For example, a direct invitation may include a popup message in a browser notifying a user that an entity is "calling," and may provide an ability to join a communication session (e.g., by clicking on the popup message). Because a web service may have to be aware of the browser's network address to send the popup, an invitee may be required to be logged into the same server/service or a known service that can provide the network address to enable sending an invitation directly to the invitee. Conversely, an indirect invitation may include electronic mail (e-mail) notifying the user that a session at a particular uniform resource identifier (URI) has begun or will begin sometime in the future, and the recipient of the e-mail may click a link in the e-mail to join the session. Such indirect invitations may be most appropriate for invitees who are not logged into an appropriate service or who do not want to share their device addresses with others.

Indirect (e.g., e-mail) invitations may be ill-suited to urgent meetings because an invitee may need to retrieve the e-mail from his or her mailbox and to use information from the e-mail to join the meeting. Thus, an e-mail invitation to a meeting may be processed in non-real-time, and a significant delay may occur before the e-mail invitation is read by the user. Further, the e-mail invitation may be accessed on a different device than the one from which a user may want join the session. Also, the device from which the user may want to join the session may not be capable of accessing the correct e-mail account, or may not have e-mail capability.

BRIEF DESCRIPTION OF THE DRAWINGS

FIG. 3 is a diagram to illustrate a particular example of a meeting request that may be displayed by a device of the system of FIG. 1;

DETAILED DESCRIPTION

Figure 1:
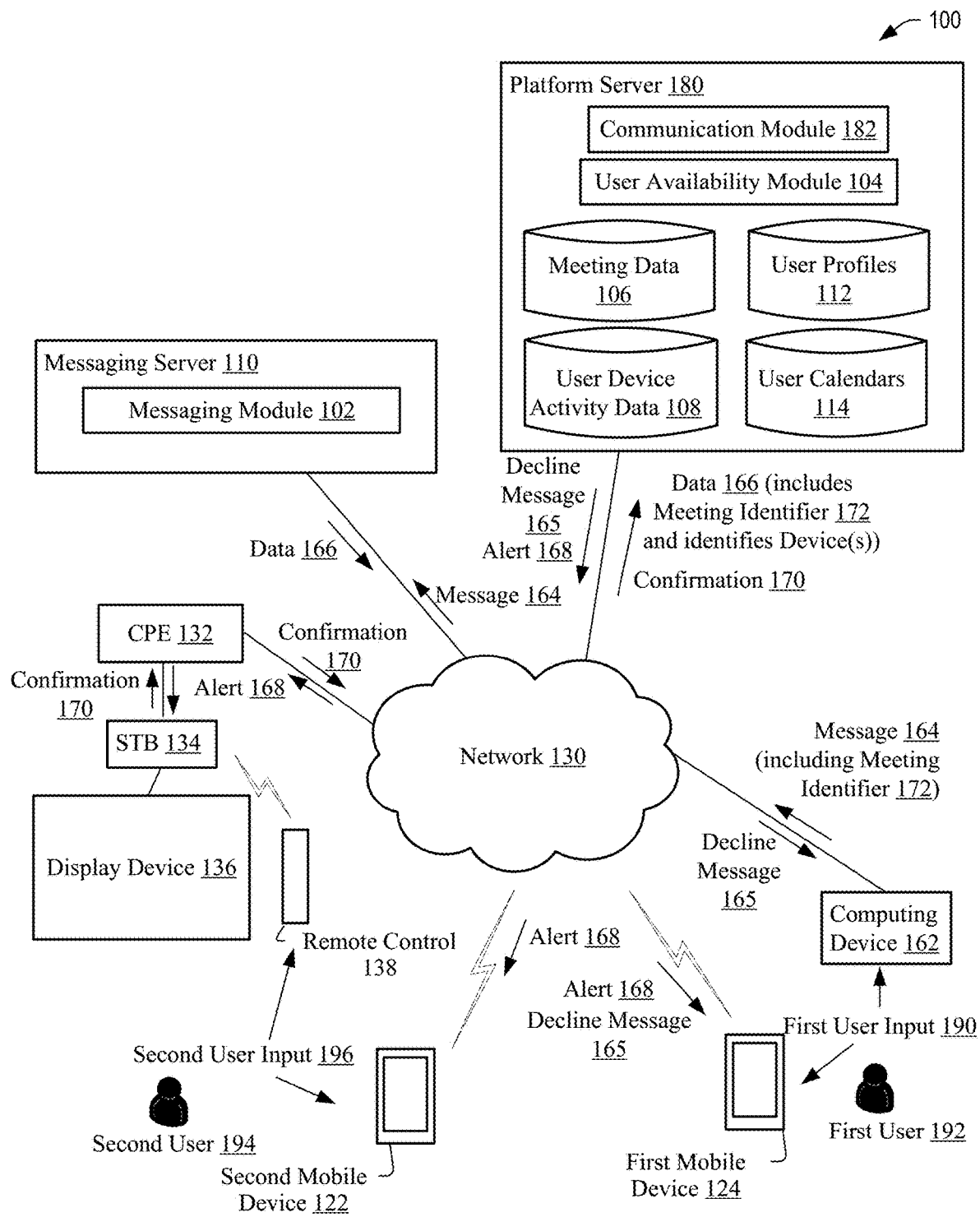
FIG. 1 is a block diagram of a particular illustrative embodiment of a system that is operable to manage meeting invitations.

A system and method of managing meeting invitations is disclosed. For example, a system that operates in accordance with the described techniques may detect e-mails and other messages directed to user devices. The system may also have access to capability/registration information of the user devices. After a particular message is detected at a messaging server (e.g., an electronic mail (e-mail) server, a short message service (SMS) server, a multimedia message service (MMS) server, etc.), the messaging server may determine a type of the message. For example, the messaging server may determine whether the message is a meeting request for a real-time meeting, a meeting request for a meeting scheduled at a particular (e.g., future) time, an acceptance of a meeting request for a scheduled meeting, a meeting update, or some other kind of message. For example, the messaging server may determine that a message from a first user to a second user is a meeting request based on a keyword in a subject line of the message, a keyword in a header of the message, a field in the header of the message, a keyword in a body of the message, a mailbox that the message is addressed to, or a combination thereof. As another example, the messaging server may determine that the message is a request for an "immediate" (e.g., real-time) meeting based on detecting that a subject line of the message includes the keywords 'MEET NOW.' When a message is determined to be a meeting request, the messaging server may provide data regarding the meeting request to a platform server. The data may indicate a meeting host, meeting invitee(s), a time of the meeting, a "location" of the meeting, etc.

Upon receiving the data, the platform server may determine whether the meeting request is for a real-time (or near-real-time) meeting or for a meeting scheduled at some time in the future. The platform server may make the determination based on the message type and/or based on a scheduled time of the meeting indicated in the data. For example, the platform server may determine that the message is a meeting request for a real-time (or near-real-time) meeting based on determining whether a scheduled time of the meeting is less than a threshold time from a current time (e.g., less than 5 minutes away). In response to determining that the meeting request is for a real-time (or a near-real-time) meeting, the platform server (or another server) may immediately (or as soon as possible) identify what device(s) can be used to contact the second user (e.g., the invitee). For example, such a determination may be based on the second user's scheduled activities in a calendar, user activity/settings, a user profile of the second user, or any combination thereof. To illustrate, a set-top box at the second user's home may be active. Based on the set-top box activity at home, the platform server may determine that the user is at home and is therefore available to communicate using the set-top box, a television at home, a home phone, and/or a mobile phone but is unavailable to communicate using a work phone and a work computer.

Further, a user profile associated with the second user may indicate that the second user is not available to communicate while the set-top box is active during a specific time, such as during 7 PM-8 PM on weekdays because the user is watching his or her favorite television show. Based on the user profile and the set-top box activity, the platform server may determine that the second user is unavailable during the specific time (e.g., 7 PM-8 PM on weekdays) while the set-top box is active and that the second user is available at other times or when the set-top box is inactive.

The platform server may "ring" the identified device(s) (e.g., by sending an alert to the device(s)) to notify the second user of the invitation to the real-time/near-real-time meeting. Different devices may receive alerts in different forms (e.g., a telephone call at a mobile phone, a popup message at a browser, a video overlay at a set-top box/television, etc.). The platform server may prompt the second user whether he or she wants to "join" the meeting (e.g., whether the second user wants to accept or decline the meeting invitation). When the second user responds to the alert from an alerted device (e.g., by accepting the meeting invitation, by answering the telephone call, etc.), the platform server may automatically establish communication between that device and other devices participating in the meeting via a web-browser session (e.g., based on a URI or other data specified in the meeting invitation). For example, the alert may include a selectable URI (e.g., a uniform resource locator (URL) and/or a uniform resource name (URN)) and the second user may select the URI at a device to establish communication between that device and other devices participating in the meeting. As another example, the second user may respond to the alert by answering a mobile device and the platform server may automatically join the mobile device to the meeting by connecting the mobile device to a multimedia telephony session using the URI.

In some cases, a message received by the messaging server may represent a meeting request for a meeting scheduled in the future (e.g., a meeting scheduled at a time more than a threshold time, such as 4 hours, from receipt of the message). For future meetings, the messaging server may wait to receive an acceptance of the meeting request before communicating with the platform server regarding the meeting. The messaging server may send data regarding a future meeting to the platform server upon receiving an acceptance to an invitation for the future meeting. Data regarding the future meeting may be stored at the platform server. At approximately the starting time of the meeting, operations similar to those described with reference to real-time/near-real-time meetings may occur. For example, at approximately the scheduled meeting time, the platform server and/or another server may determine that the invitee that accepted the meeting request is available to communicate using a particular device. The platform server may "ring" the particular device (e.g., by sending an alert to the first device) and may automatically join the particular device to the meeting. Because the invitee already accepted the meeting request, the invitee may not be prompted to accept or decline the meeting.

In some cases, a received meeting request may correspond to a meeting that is scheduled for a time (e.g., 20 minutes away) that is sufficiently distant to exceed the real-time threshold (e.g., 5 minutes) but does not exceed a future meeting threshold (e.g., 4 hours). In such cases, the platform server may wait until the scheduled meeting time (or approximately the scheduled meeting time) to determine user availability and will "ring" the appropriate device(s) (e.g., by sending an alert) at approximately the scheduled meeting time. By waiting until approximately the scheduled meeting time, the described system may handle such meeting requests as real-time meeting requests. It should be noted that the thresholds used herein (e.g., 5 minutes and 4 hours) are for illustration only, and one or more other threshold values may instead be used.

The described system and method may thus provide real-time/near-real-time processing for immediate meetings and intelligent processing of requests/acceptances of future meetings, independent of the device to be used to participate in the meeting.

In a particular embodiment, a method includes receiving, at a messaging server, a message from a first device associated with a first user. The message is directed to a second user. The method also includes determining whether the message is associated with a meeting. The method further includes, in response to determining that the message is associated with the meeting, sending data related to the meeting to a platform server to enable the platform server to send an alert regarding the meeting to a second device associated with the second user.

In another particular embodiment, a computer-readable storage device stores instructions that, when executed by a processor, cause the processor to receive, at a platform server, data related to a message from a first user directed to a second user. The message is associated with a meeting. The computer-readable storage device further stores instructions that, when executed by the processor, cause the processor to select a second device based on an availability of the second user to communicate using the second device. The computer-readable storage device also stores instructions that, when executed by the processor, cause the processor to determine a communication capability of the second device, to generate an alert regarding the meeting based on the communication capability, and to send the alert to the second device.

In another particular embodiment, a system includes a processor and memory. The memory stores instructions, that when executed by the processor, cause the processor to receive a message from a first device associated with a first user. The message is directed to a second user. The memory further stores instructions, that when executed by the processor, cause the processor to determine whether the message is associated with a meeting and, in response to determining that the message is associated with the meeting, to send data related to the meeting to a platform server to enable the platform server to send an alert regarding the meeting to a second device associated with the second user.

Referring to FIG. 1, a block diagram of a particular illustrative embodiment of a system 100 is shown. The system 100 includes a messaging server 110 communicatively coupled to a platform server 180 via a network 130. The messaging server 110 may also be communicatively coupled, via the network 130, to a first mobile device 124 (e.g., a cell phone, a tablet computer, etc.), to a second mobile device 122 (e.g., a cell phone, a tablet computer, etc.), to a set-top box device 134, to a computing device 162 (e.g., a laptop computer, a desktop computer, etc.), or any combination thereof. The network 130 may include one or more networks enabling open system interconnection (OSI) layer 1 through OSI layer 7 connectivity between devices, such as a public network, a private network, a service provider network, a carrier network, an internet protocol television (IPTV) network, a wireless network, a radio access network, a global system for mobile communications (GSM) network, a cellular network, a third generation (3G) network, a fourth generation (4G) network, a long term evolution network (LTE), etc. While two mobile devices 122 and 124, one set-top box device 134, and one computing device 162 are illustrated, it should be understood that the system 100 may involve communication between fewer or more than the illustrated number of electronic devices.

The mobile devices 122 and 124 may communicate according to one or more standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, one or more other standards, or a combination thereof.

The set-top box device 134 may be communicatively coupled to the network 130 via customer premises equipment (CPE) 132 (e.g., a router, a residential gateway, etc.). The set-top box device 134 may also be communicatively coupled to a display device 136 (e.g., a television) and to a remote control device 138.

The messaging server 110 may be a network-accessible computing device, such as a server computer. The messaging server 110 may include a messaging module 102. In a particular embodiment, the messaging module 102 may be implemented using software (e.g., instructions executable by a processor), hardware, or a combination thereof. It should be noted that in other embodiments, functionality described with reference to the messaging module 102 may be integrated into a single module or divided into more than one module.

The platform server 180 may be a network-accessible computing device, such as a server computer. The platform server 180 may include a communication module 182, a user availability module 104, or any combination thereof. In a particular embodiment, the modules 104 and 182 may be implemented using software (e.g., instructions executable by a processor), hardware, or a combination thereof. It should be noted that in other embodiments, functionality described with reference to the modules 104 and 182 may be integrated into a single module or divided into more than two modules. The platform server 180 may store or otherwise have access to meeting data 106, user device activity data 108, user profiles 112, user calendars 114, other data, or any combination thereof. In some embodiments, functionality described with reference to each of the messaging server 110 and the platform server 180 may be performed by the other of the messaging server 110 and the platform server 180, combined into a single server (e.g., a meeting management server), performed by one or more other servers, or any combination thereof.

The meeting data 106 may include meeting information, such as a meeting identifier, a meeting host user identifier, a meeting invitee user identifier, an e-mail address of a meeting invitee user, an e-mail address of a meeting host user, a meeting time, a meeting title, a meeting URI, a meeting conference number, other meeting data, or a combination thereof.

The user device activity data 108 may include information descriptive of activity of devices associated with a user (e.g., channel changes made by the user while watching television, content requests, power up of devices, power down of devices, data upload, data download, calls received, calls made, data received, data sent, etc.). The user calendars 114 may include calendar events, where each calendar event may correspond to an activity and/or a location associated with a user (e.g., traveling, watching a program, in a meeting, at work, at home, at the gym, etc.). The user calendars 114 may thus be usable to determine an availability of one or more users to attend meetings at particular times.

The user profiles 112 may include user preferences regarding device availability for meetings (e.g., a preference to use a particular device at a particular location to participate in meetings, such as a set-top box at home when the set-top box is active) and preferences regarding receiving alerts at the devices (e.g., how many alerts related to a particular meeting are to be sent to a device and a frequency of sending the alerts while a confirmation is not received related to the particular meeting). The user profiles 112 may also include device communication capabilities. Examples of device communication capabilities include, but are not limited to, a device capability for a particular service, a network support for the service, a valid subscription for the service, a willingness of a user to use the service, or a combination thereof. For example, a mobile device may be capable of receiving text messages, may have network support for receiving text messages, may have a valid subscription for receiving text messages, and a user associated with the mobile device may be willing to receive text messages on the mobile device. Examples of services include text messaging, voice, video, group chat, interne browsing, high quality voice, file transfer, thumbnail image display of files, delivery notification, location, global positioning system exchange format (GPX), multimedia messaging service (MMS), short message service (SMS), one or more other services, or a combination thereof. The capability information stored in the user profiles 112 may also identify other capabilities of a device. For example, certain electronic devices may have capability for high speed transmission or for display of high definition (HD) content while other electronic devices may have more limited video or transmission capabilities. The user profiles 112 may also include format information (e.g., protocol negotiation, data exchange format, authentication, extensible markup language (XML), simple object access protocol (SOAP), hypertext transfer protocol (HTTP)). For example, such information may indicate in what format(s) a user prefers to receive messages. In a particular embodiment, information may be stored in the user profiles 112 during user registration and may be updated dynamically based on user actions.

The system 100 may be configured such that each of the devices 122, 124, 134, and 162 can receive similar input, generate similar output, and perform similar functions. During operation, a user (e.g., an illustrative first user 192) may create a meeting request. For example, the first user 192 may access a calendar using a device (e.g., the computing device 162). An example of calendar information that may be displayed is described in further detail with respect to FIG. 2.

The first user 192 may provide first user input 190 identifying meeting information and invitee information (e.g., an e-mail address of an illustrative invited second user 194). The first user input 190 may be received by the first mobile device 124, the computing device 162, or any combination thereof. For example, the first user input 190 may be received via an input interface (e.g., a touch screen, etc.) of the first mobile device 124 and/or via an input device of the computing device 162 (e.g., a keyboard, a mouse, etc.). The meeting information may indicate a meeting time, a meeting title, a meeting URI, a meeting phone number, a device capability, a meeting location, other meeting information, or any combination thereof. The first user input 190 may indicate a user selection of an option to send a meeting request to one or more invitees (e.g., to the e-mail address of the second user 194).

In response to the first user input 190, the computing device 162 may send a message 164 (e.g., an electronic mail message) addressed to the second user 194 (i.e., to the e-mail address of the second user 194). The message 164 may include a meeting identifier 172, other meeting information, an e-mail address of the first user 192, an e-mail address of the second user 194, an identifier associated with the first user 192, an identifier associated with the second user 194, other information, or a combination thereof. The meeting identifier 172 may be provided by the first user 192 via the first user input 190, automatically generated by the computing device 162, or a combination thereof. For example, the computing device 162 may generate the meeting identifier 172 based on a user identifier associated with the first user 192 (such as a name of the first user 192 or an alphanumeric identifier associated with the first user 192). For example, if the first user 192 is named Bob, a default meeting identifier may be "Bob's meeting."

The messaging server 110 may be associated with a mailbox (e.g., an e-mail account, an SMS inbox, etc.) of the second user 194 and may receive the message 164 directed to the mailbox. It should be noted that the functionality provided by the messaging server 110 and/or the platform server 180 may be access-independent. To illustrate, the first user 192 and the second user 194 may be serviced by the same service provider network or by different service provider networks (e.g., the first user 192 and the second user 194 may have different voice, video, and/or data providers). The message 164 may be stored by the messaging server 110 for subsequent retrieval by the second user 194 (e.g., when the second user 194 "logs in" to check his/her e-mail).

Upon receiving the message 164, the messaging module 102 of the messaging server 110 may examine the message 164 to determine a type of the message, e.g., whether the message 164 is a meeting request for a scheduled meeting, an acceptance of a meeting request, a meeting request for a meet now meeting, a meeting update, or some other kind of message. For example, such a determination may be made based on a keyword in a subject line of the message 164, a keyword in a header of the message 164, a field in the header of the message 164, a keyword in a body of the message 164, the mailbox that the message 164 is addressed to, or a combination thereof. To illustrate, the messaging module 102 may determine that the message 164 is a meeting request based on determining that the message 164 includes a duration field indicating a scheduled duration of a meeting and that a subject of the message 164 does not begin with keywords 'Accepted', 'Declined', or 'Update.' As another example, the messaging module 102 may determine that the message 164 is a meeting request based on the presence of the meeting identifier 172 in the message 164. As a further example, after determining that the message 164 is a meeting request, the messaging module 102 may determine that the message 164 is a meeting request for a meet now meeting based on detecting that a subject of the message 164 includes keywords 'MEET NOW.' Alternatively, the messaging module 102 may determine that the message 164 is a meeting request for a scheduled meeting based on determining that the keywords 'MEET NOW' are absent in the subject of the message 164 and/or that the message 164 includes a beginning time field.

In response to determining that the message 164 is a meeting request, the messaging server 110 may send data 166 to the platform server 180. The data 166 may include the message type and meeting information, such as the meeting identifier 172, the meeting title, the meeting URI, the meeting phone number, the meeting location, the e-mail address of the first user 192, the e-mail address of the second user 194, a message body of the message 164, a message header of the message 164, the identifier associated with the first user 192, the identifier associated with the second user 194, other information, or a combination thereof. The meeting request may be for a physical meeting, a virtual meeting, or a combination thereof. To illustrate, the meeting request may indicate a location where one or more invitees are requested to attend the meeting. For example, one invitee may be requested to join the meeting remotely via a telephony device (i.e., a virtual meeting) while another invitee may be requested to attend the same meeting from a particular conference room (i.e., a physical meeting).

Upon receiving the data 166, the platform server 180 may determine whether the meeting request is for a real-time (or near-real-time) meeting or for a meeting scheduled at some time in the future. For example, the platform server 180 may check the data 166 for a message type, a keyword and/or a field associated with the message 164 (e.g., a message type associated with the message 164, a keyword in a subject of the message 164, a keyword in a body of the message 164, a keyword in a header of the message 164, and/or a field of the header of the message 164), or a combination thereof. Alternately, or in addition, the type of meeting may be determined based on a time of the scheduled meeting. For example, a real-time/near-real-time meeting (also referred to herein as an "immediate" meeting or a "meet now" meeting) may be identified based on a message type. As another example, a real-time/near-real-time meeting may be identified based on a starting time of the scheduled meeting being less than a threshold from a current time (e.g., 5 minutes).

An example of operation at the system 100 of FIG. 1 in response to a real-time/near-real-time meeting request (also referred to herein as a request for an "immediate" meeting) may include the messaging module 102 receiving the message 164 at 11:00 AM for a meeting scheduled at 11:05 AM of the same day (or a header of the message 164 may include the keywords 'MEET NOW') and immediately (or as soon as possible) sending the data 166 associated with the meeting to the platform server 180.

When the platform server 180 determines that the intercepted meeting request is for an immediate meeting, the user availability module 104 may immediately (or as soon as possible) determine what devices may be used to communicate with the second user 194. For example, the user availability module 104 may determine availability of the second user 194 without intentional user-perceptible delay after the platform server 180 receives the data 166. The second user 194 may be associated with a plurality of devices (e.g., the set-top box device 134 and the second mobile device 122). The user availability module 104 may determine user availability based on the user device activity data 108, the user calendars 114, the user profiles 112, a device capability indicated in the message 164, or a combination thereof. For example, the user device activity data 108 may store a time and a location of the second mobile device 122 indicating when the second mobile device 122 was most recently used (e.g., to make/receive a voice call, to send/receive a text message, and/or to upload/download data). Based on the user device activity data 108, the user availability module 104 may determine that the second user 194 is available to participate in the meeting using the second mobile device 122 and/or using other devices proximate to the second mobile device 122 (e.g., the set-top box device 134). Alternatively, or in addition, the user availability module 104 may determine that the second user 194 is unavailable to participate in the meeting using devices remote from the second mobile device 122 (e.g., a work computer and/or a work phone).

In a particular embodiment, the user calendars 114 may indicate that the second user 194 is busy at a certain time of the day. For example, the user calendars 114 may indicate that the second user 194 is scheduled to have lunch with someone across town in two hours. Based on a location of the lunch indicated by the user calendars 114, the user availability module 104 may determine that a traveling time from the home of the second user 194 to the lunch location is approximately half an hour. Thus, the user availability module 104 may determine that the second user 194 is available to use the second mobile device 122 or the set-top box device 134 to participate in a meeting for approximately the next hour and a half based on the user device activity data 108 and the user calendars 114.

In a particular embodiment, the user profiles 112 may indicate meeting preferences of the second user 194. For example, the user profiles 112 may indicate that the second user 194 has no preference between devices for participating in meetings from home. The user availability module 104 may further determine user availability based on the user profiles 112. For example, the user availability module 104 may determine that the second user 194 is available to use the second mobile device 122 or the set-top box device 134 to participate in a meeting based on the user device activity data 108 and the user profiles 112.

In a particular embodiment, the data 166 may indicate that the message 164 identified a device capability (e.g., voice, video, high definition (HD), group chat, internet browsing, high quality voice, or a combination thereof). The message 164 may identify the device capability as a condition for participating in the meeting. The user availability module 104 may further determine user availability based on a device capability indicated in the message 164. For example, the message 164 may indicate that video capability is required for participating in the meeting. The user profiles 112 may include a user profile of the second user 194. The user profile of the second user 194 may indicate that video communication capability is enabled at the set-top box device 134 but is not enabled at the second mobile device 122. Thus, the user availability module 104 may determine that the second user 194 is available to communicate using a subset (e.g., the set-top box device 134, but not the second mobile device 122) of devices that were initially identified as available based on the user device activity data 108. In an alternative embodiment, devices associated with the second user 194 that meet the device capability requirements indicated in the message 164 may be identified and then a subset of the identified devices that the second user 194 is available to use may be determined based on the user device activity data 108. In an alternative embodiment, the user availability may be at least partially determined by a component other than the messaging server 110, e.g., by the platform server 180 or by a combination of the messaging server 110 and the platform server 180.

When the data 166 indicates an "immediate" meeting, the communication module 182 may immediately (or as soon as possible) generate an alert 168 directed to the devices identified by the data 166 (e.g., the second mobile device 122 and the set-top box device 134).

The alert 168 may be based on the device communication capabilities indicated in the user profiles 112. For example, the alert 168 directed to the set-top box device 134 may be a text message or may correspond to a textual overlay and the alert 168 directed to the second mobile device 122 may be a session initiation protocol (SIP) invite message. While e-mail, text messages, and SIP messages have been described, the system 100 may include one or more alternative, or additional, protocols or messaging options. For example, alternate data communication protocols or message options that may be used include extensible markup language (XML), hypertext transfer protocol (HTTP), universal plug and play (UPnP), simple object access protocol (SOAP), transmission control protocol (TCP), internet protocol (IP), wireless fidelity (WiFi), simple service discovery protocol (SSDP), and/or capability discovery protocols.

Each device receiving the alert 168 may notify the invited user regarding the meeting. For example, the set-top box device 134 may cause a popup message to be displayed at the display device 136 and the second mobile device 122 may play a particular ring-tone in response to receiving the alert 168. The second user 194 may use the remote control device 138 to select an option (e.g., a button) of the popup message confirming that the second user 194 is available to participate in the meeting using the set-top box device 134, and the set-top box device 134 may send a confirmation 170 to the platform server 180. Once the second user 194 "answers" the meeting request using a particular device, other device(s) may stop "ringing." In a particular embodiment, a device may play a ring-tone in response to receiving the alert 168. The communication module 182 may connect the device to the meeting in response to a user (e.g., the second user 194) "answering" the device (e.g., by pressing a talk button or by selecting a talk option). In another particular embodiment, the communication module 182 may send an audio message regarding the meeting to be played in response to the second user 194 answering the device. The second user 194 may be presented with an option to join the meeting and the communication module 182 may connect the device to the meeting after receiving the confirmation 170 from the device indicating that the second user 194 has selected to join the meeting.

In a particular embodiment, the communication module 182 may send the alert 168 to the devices at a frequency indicated by device communication preferences. For example, the user profiles 112 may indicate that the second user 194 prefers to receive up to two alerts related to a particular meeting on the second mobile device 122 at five minutes intervals until the meeting is confirmed or declined. The communication module 182 may send the alert 168 to the second mobile device 122 a second time five minutes after sending the initial alert 168 if the confirmation 170 is not received from the set-top box device 134.

In a particular embodiment, when the communication module 182 does not receive a confirmation 170 within a threshold time of sending a last alert 168 or receives a second user input 196 indicating that the second user 194 has declined the meeting, the communication module 182 may send a decline message 165 to the first user 192 to indicate that the second user 194 was non-responsive or that the second user 194 declined the meeting. For example, the second mobile device 122 may send a second user input 196 to indicate to the communication module 182 that the second user 194 declined the meeting, and the communication module 182 may send an e-mail message to the e-mail address associated with the first user 192 indicating that the second user 194 declined to participate in the meeting. Alternately, or in addition, if the meeting started without the second user 194, a text, audio, and/or video message may be provided to the first user 192 and/or the meeting participants indicating that the second user 194 will not be attending the meeting and/or has not yet responded (e.g., is running late).

In response to receiving the confirmation 170 (e.g., the second user 194 accepted the invitation to the meeting), the communication module 182 may automatically join the accepting device (e.g., set-top box device 134) to the meeting. For example, a device may be joined to a meeting via a voice call, a video conference, a web-browser session, a chat session, a web communications session, or any combination thereof. To illustrate, the communication module 182 may join the set-top box device 134 to a web real time communication (WebRTC) session indicated by a URI stored in the meeting data 106. In this fashion, the second user 194 may join real-time meetings when a dynamically determined device rings in response to a meeting request. Thus, the second user 194 may be enabled to participate in true ad-hoc meetings with anyone anywhere regardless of service provider.

In an example of operation at the system 100 of FIG. 1 in response to a request for a "future" meeting, when the messaging module 102 determines that the starting time of the meeting is greater than the second threshold (i.e., is more than four hours away), the messaging server 110 may wait to receive a message from the second user 194 indicating acceptance of the meeting request of the message 164 before communicating with the platform server 180. That is, for "future" meetings (e.g., meetings more than four hours into the future), the acceptance of the meeting request, and not the meeting request itself, may trigger operations at the platform server 180.

Thus, in a particular embodiment, the message 164 may be an acceptance from the first user 192 of a previous meeting request sent by the second user 194. For example, the meeting request sent by the second user 194 may have been displayed at a device (e.g., the first mobile device 124 and/or the computing device 162) associated with the first user 192. An example of information that may be displayed is described in further detail with respect to FIG. 3. The meeting request display may include information regarding the meeting and may provide the first user 192 with an option to accept the meeting request. In response to a user selection of the option to accept the meeting request, the message 164 (e.g., an e-mail message) indicating the acceptance may be sent to the second user 194 (e.g., to an e-mail address of the second user 194). The messaging server 110 may receive the message 164 and may determine that the message 164 is an acceptance message. In response, the messaging server 110 may send the data 166 to the platform server 180. Hence, the messaging server 110 may wait to receive an acceptance message from a user when a meeting request is received sufficiently in advance (i.e., the meeting is scheduled far enough into the future). The platform server 180 may send alerts to user devices at the meeting time, provided that the corresponding invited user(s) have accepted the meeting request.

In a particular embodiment, the messaging module 102 may determine that the message 164 is neither a meeting request nor a meeting acceptance, but is rather an update regarding a meeting request previously sent by the first user 192. In response, the messaging module 102 may send data 166 to the platform server 180. The data 166 may indicate a meeting update and may include a meeting identifier 172 associated with the meeting to be updated. The data 166 may also include updated meeting information, e.g., an updated meeting title, an updated meeting time, a meeting cancelation, an update in meeting invitees, or a combination thereof. Upon receiving the data 166, the platform server 180 may update the meeting data 106 based on the meeting identifier 172 and the updated meeting information. For example, the meeting title, time, and/or invitees may be updated, or the meeting may be canceled. In response to a meeting update, corresponding data may be updated in the meeting data 106 and/or user calendars 114. Update information may also be communicated to users (e.g., via e-mail messages, alerts, etc.).

In some situations, the messaging server 110 may intercept a meeting request for a meeting that is neither an "immediate" meeting (e.g., the meeting is more than 5 minutes away) nor a "future" meeting (e.g., the meeting is less than 4 hours away). In such situations, the platform server 180 may transform the meeting request into an "immediate" meeting request and proceed accordingly. For example, the messaging module 102 may receive the message 164 at 11:00 AM for a meeting scheduled at 11:20 AM on the same day. The messaging server 110 may send data 166 to the platform server 180. However, the platform server 180 may refrain from checking user availability and/or sending alerts until approximately the meeting time (e.g., 11:18 AM), as described above with reference to "immediate" meetings. In alternate embodiments, the messaging server 110, instead of the platform server 180, may wait to act on the meeting request. To illustrate, the messaging server 110 may wait to send data 166 associated with the meeting request to the platform server 180 until approximately the meeting time. Upon receiving the data 166, the platform server 180 may process the 11:20 AM meeting as an "immediate" meeting.

The system 100 may thus enable cross-platform meeting management for "immediate" and "future" meetings. In addition, meeting participation by a user's device may be synchronized with a user's availability to use the device. The system 100 of FIG. 1 may be used to automatically alert a user device for a meeting based on user device activity, a user profile, a user calendar, and/or capability requirements indicated in a meeting request. The device to be alerted may be dynamically determined at the time of the meeting, so that the user may not have to manually specify a different device when the user's schedule changes. Hence, the user may participate in a meeting via a different device than the one used to accept a meeting request. Further, the user device may be automatically joined to the meeting at the meeting time. For example, the user may not have to select a URI or dial a conference number, and may instead answer a "ring" at the meeting time. The system 100 of FIG. 1 may automatically (e.g., without requiring the user to click on a hyperlink, dial a phone number, etc.) establish communication between the device and other devices participating in the meeting.

Figure 2:
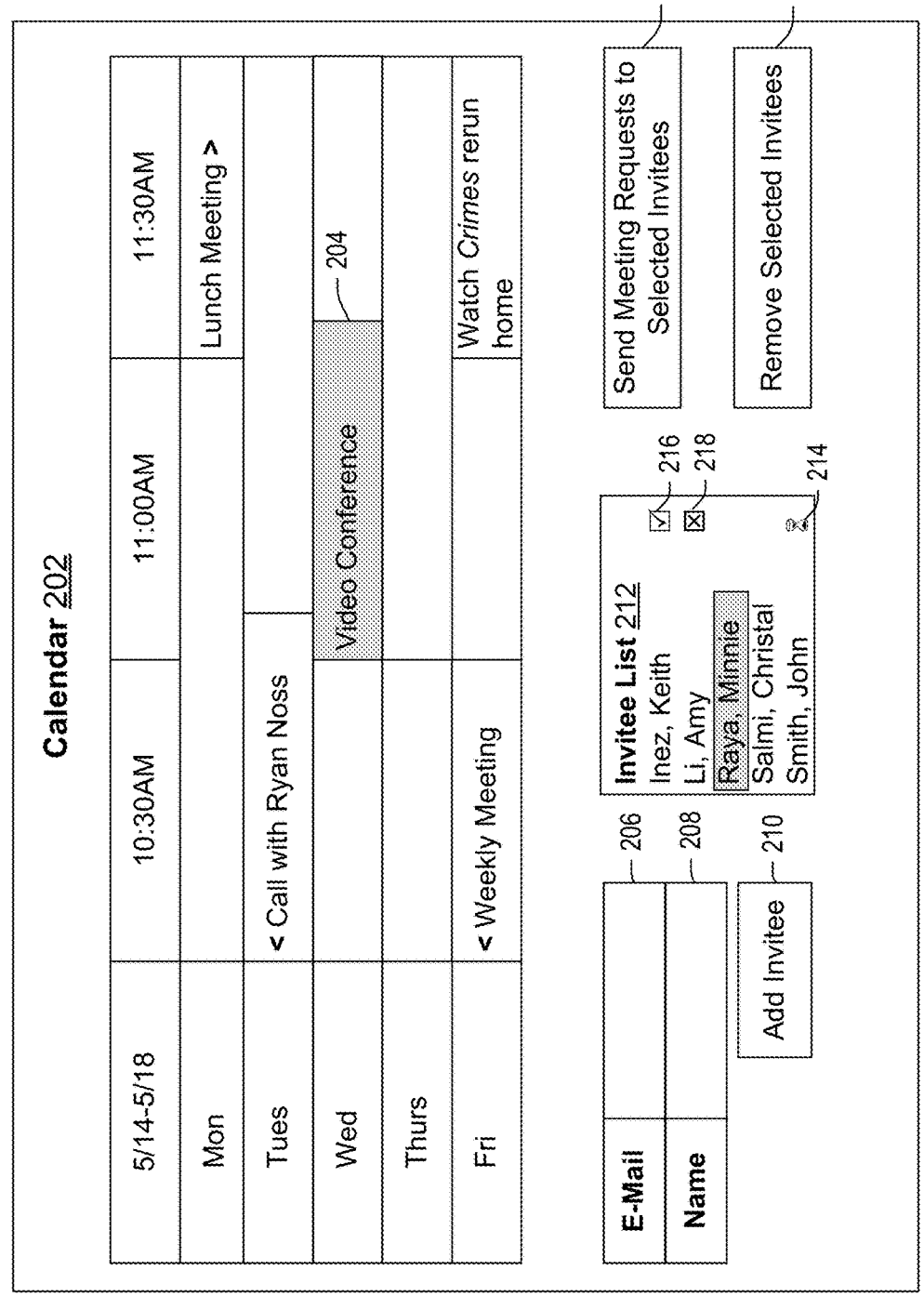
FIG. 2 is a diagram to illustrate a particular example of a user calendar that may be displayed by a device of the system of FIG. 1.

Referring to FIG. 2, a diagram of a particular example of a user calendar that may be displayed by a device of the system of FIG. 1 is shown and is generally designated 200. For example, the calendar 202 may display scheduled activities and meetings of the first user 192 of FIG. 1 at a display of the computing device 162 of FIG. 1. In FIG. 2, the calendar 202 indicates that the first user 192 has a lunch meeting scheduled at 11:30 AM on Monday, May 14 and that the first user 192 is scheduled to watch a 'Crimes' rerun from home at 11:30 AM on Friday, May 18. In a particular embodiment, the calendar 202 may be based on calendar information stored in the user calendars 114 of FIG. 1.

The first user 192 may update his or her user calendar, such as by adding or changing meeting entries. For example, the first user 192 may add a meeting entry 204 to the calendar 202 using an option to add an invitee (e.g., the second user 194). For example, the calendar 202 includes an e-mail input 206, a name input 208, and an add invitee button 210. The first user 192 may provide an e-mail address of the second user 194 via the e-mail input 206, a name of the second user 194 via the name input 208, and select the add invitee button 210. In response to a selection of the option to add an invitee, the second user 194 may be added to a list of invitees. For example, in response to a selection of the add invitee button 210, the second user 194 may be added to an invitee list 212 associated with the meeting entry 204, as shown.

The list of invitees may indicate a meeting request status associated with each user in the list, such as by indicating whether a meeting request has been sent and whether the invited user has accepted or declined the meeting request. For example, the invitee list 212 displays no icons next to Minnie Raya and Christal Salmi, indicating that a meeting request has not been sent to them. The invitee list 212 displays an hourglass icon 214 next to John Smith, indicating that a meeting request has been sent to him but that a response has not been received. The invitee list 212 displays a check mark icon 216 next to Keith Inez to indicate that a meeting request has been sent and that an acceptance has been received from him. The invitee list 212 displays an 'X' icon 218 next to Amy Li to indicate that a meeting request has been sent and that the meeting request has been declined by her. Although the icons 214, 216, and 218 are illustrated, it should be understood that the meeting request status may be displayed in other ways, such as via text, formatting, highlighting, and/or other icons, as illustrative, non-limiting examples.

User entries indicated in the invitee list 212 may be selectable and the user calendar 202 may include an option to send a meeting request to each selected user. For example, the user Minnie Raya is shown as selected in FIG. 2. In response to a user selection of an option 220 to send meeting requests to the selected users, a computing device (e.g., the computing device 162 of FIG. 1) may send a message including a meeting request directed to Minnie Raya, as described with reference to the message 164 of FIG. 1.

In a particular embodiment, a user calendar may also include an option to remove a user from the invitee list. For example, the calendar 202 includes an option 222 to remove selected users from the invitee list 212. In response to a selection of the option 222, the selected user(s) may be removed from the invitee list 212. If a meeting request has already been sent to the selected user, the computing device 162 may send a message including a meeting update directed to the selected user. For example, if the selected user is John Smith, a corresponding entry may be removed from the invitee list 212 in response to a selection of the option 222. In addition, the computing device 162 may send a message 164 directed to an e-mail address of John Smith, the message 164 including a meeting update indicating that John Smith is no longer invited to participate in the meeting. In a particular embodiment, a message may not be sent to a selected user in response to a selection of the option to remove the user when the selected user has already declined the meeting request. For example, if the selected user is Amy Li, a corresponding entry may be removed from the invitee list 212 but a meeting update may not be sent to her since she has previously declined the meeting request.

The first user 192 may have the ability to update meeting entries in the user calendar 202. For example, the first user 192 may move the meeting entry 204 to a different day/time, change a title of the meeting entry 204, etc. The computing device 162 may send a message 164 indicating a meeting update directed to one or more users in the invitee list 212 in response to the update of the meeting entry 204. For example, the calendar 202 may display options to confirm whether a message indicating a meeting update should be sent to all users in the invitee list, to users in the invitee list that a meeting request has already been sent to, or to specific users in the invitee list. In response to a user selection of an option, the computing device 162 may send a message 164 indicating a meeting update to one or more invited users. In a particular embodiment, a message 164 indicating the meeting update may be automatically sent to each user in the invitee list that is a recipient of a previously sent meeting request.

Referring to FIG. 3, a diagram of a particular example of a meeting request that may be displayed by a device of the system of FIG. 1 is shown and is generally designated as 300. In an illustrative embodiment, the meeting request 302 may be an e-mail message displayed via an e-mail interface (e.g., a web-browser or an e-mail application). For example, the second user 194 of FIG. 1 may add the first user 192 to a meeting entry in a user calendar associated with the second user 194, as described with reference to FIG. 2. The meeting request may include meeting information. For example, the meeting request 302 includes a meeting title 304, a meeting time 306, a meeting host 308, another invitee list 310, and a meeting URI 318. The meeting request 302 may include an ignore option 312, a decline option 314, and an accept option 316. The computing device 162 may display the meeting request 302 and receive user input (e.g., first user input 190 of FIG. 1) from the invited first user 192. The computing device 162 may send a message indicating that the meeting was declined in response to a selection of the decline option by the first user 192. For example, a message 164 of FIG. 1 may be sent by the computing device 162 in response to a user selection of the decline option 314. The message 164 may be directed to the second user 194. Alternatively, the computing device may send a message indicating that the meeting was accepted in response to a selection of the accept option 316. For example, the computing device 162 may send a message 164 indicating an acceptance of the meeting request. The message 164 may be directed to the second user 194. In a particular embodiment, no message is sent in response to a selection of the ignore option 312.

Figure 4:
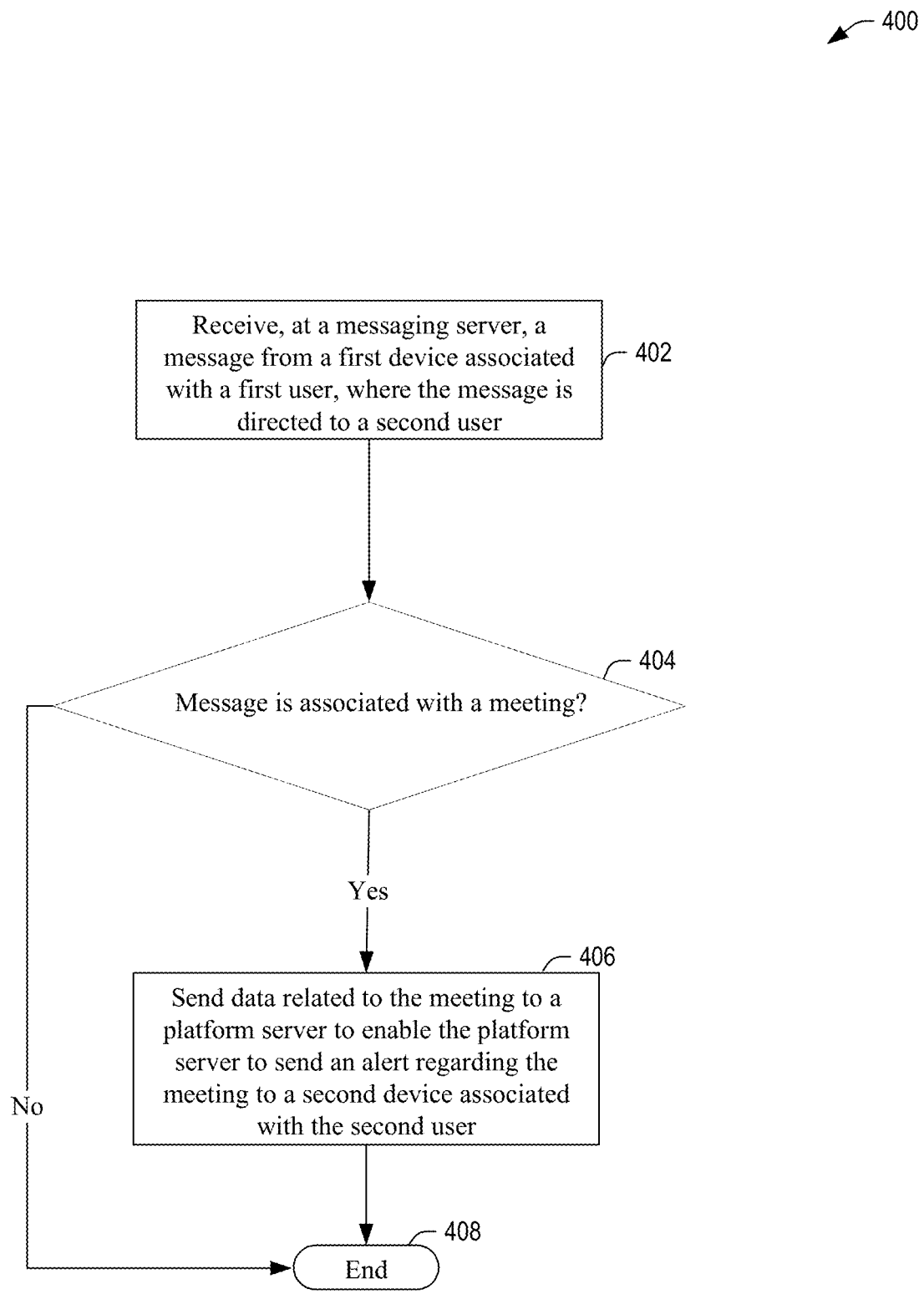
FIG. 4 is a flowchart to illustrate a particular embodiment of a method of managing a meeting invitation.

FIG. 4 is a flowchart to illustrate a particular embodiment of a method 400 of managing meetings. In an illustrative embodiment, the method 400 may be performed by the system 100 of FIG. 1 and may be performed in accordance with the embodiments illustrated in FIGS. 2-3.

The method 400 may include receiving, at a messaging server, a message from a first device associated with a first user, where the message is directed to a second user, at 402. For example, in FIG. 1, the messaging server 110 may receive the message 164 from the computing device 162 associated with the first user 192 and the message 164 may be directed to the second user 194.

In a particular embodiment, the message 164 may be a meeting request (e.g., a request for a real-time or near-real-time meeting). The computing device 162 may send the meeting request in response to receiving first user input 190 indicating a user selection of an option to send a meeting request to the second user 194. For example, the first user 192 may select the option 220 of the calendar 202 of FIG. 2 to send meeting requests to selected invitees from the invitee list 212 associated with a meeting entry 204. A meeting identifier may be associated with the meeting entry 204. The meeting identifier may be received via first user input 190 or may be generated automatically by the computing device 162. The message 164 may include the meeting identifier. For example, the message 164 may include the meeting identifier 172.

In a particular embodiment, the message 164 may be an acceptance of a meeting request (e.g., a request for a future meeting) previously sent to the first user 192. The computing device 162 may send the acceptance in response to receiving first user input 190 indicating a user selection of an option to accept a meeting request. For example, the first user 192 may select the option 316 of FIG. 3 to accept a meeting request 302. The acceptance may include a meeting identifier associated with the meeting request. For example, the message 164 may include the meeting identifier 172.

The method 400 may also include determining whether the message is associated with a meeting, at 404. A messaging server may determine that a received message is associated with a meeting based on a keyword in a subject line of the message, a keyword in a header of the message, a field in the header of the message, a keyword in a body of the message, a mailbox that the message is addressed to, or a combination thereof. For example, in FIG. 1, the messaging module 102 of the messaging server 110 may determine that the message 164 is a meeting request when a header of the message 164 includes a duration field indicating a scheduled duration of the meeting and when a subject of the message 164 does not begin with keywords 'Accepted', 'Declined', or 'Update'. As another example, the messaging module 102 may determine that the message 164 is an acceptance of a meeting request when the header of the message 164 includes the duration field and when the subject of the message 164 begins with the keyword 'Accepted'. As another example, the messaging module 102 may determine that the message 164 is an update of a previous meeting request when the header of the message 164 includes a meeting identifier field and when the subject of the message 164 begins with the keyword 'Update.'

The method 400 may further include, in response to determining that the message is associated with a meeting, sending data related to the meeting to a platform server to enable the platform server to send an alert regarding the meeting to a second device associated with the second user, at 406. For example, in FIG. 1, the messaging module 102 may send data 166 to the platform server 180 to enable the platform server 180 to send an alert 168 regarding the meeting to a device (e.g., the set-top box device 134 and/or the second mobile device 122) associated with the second user 194. The method 400 may end, at 408.

Figure 5:
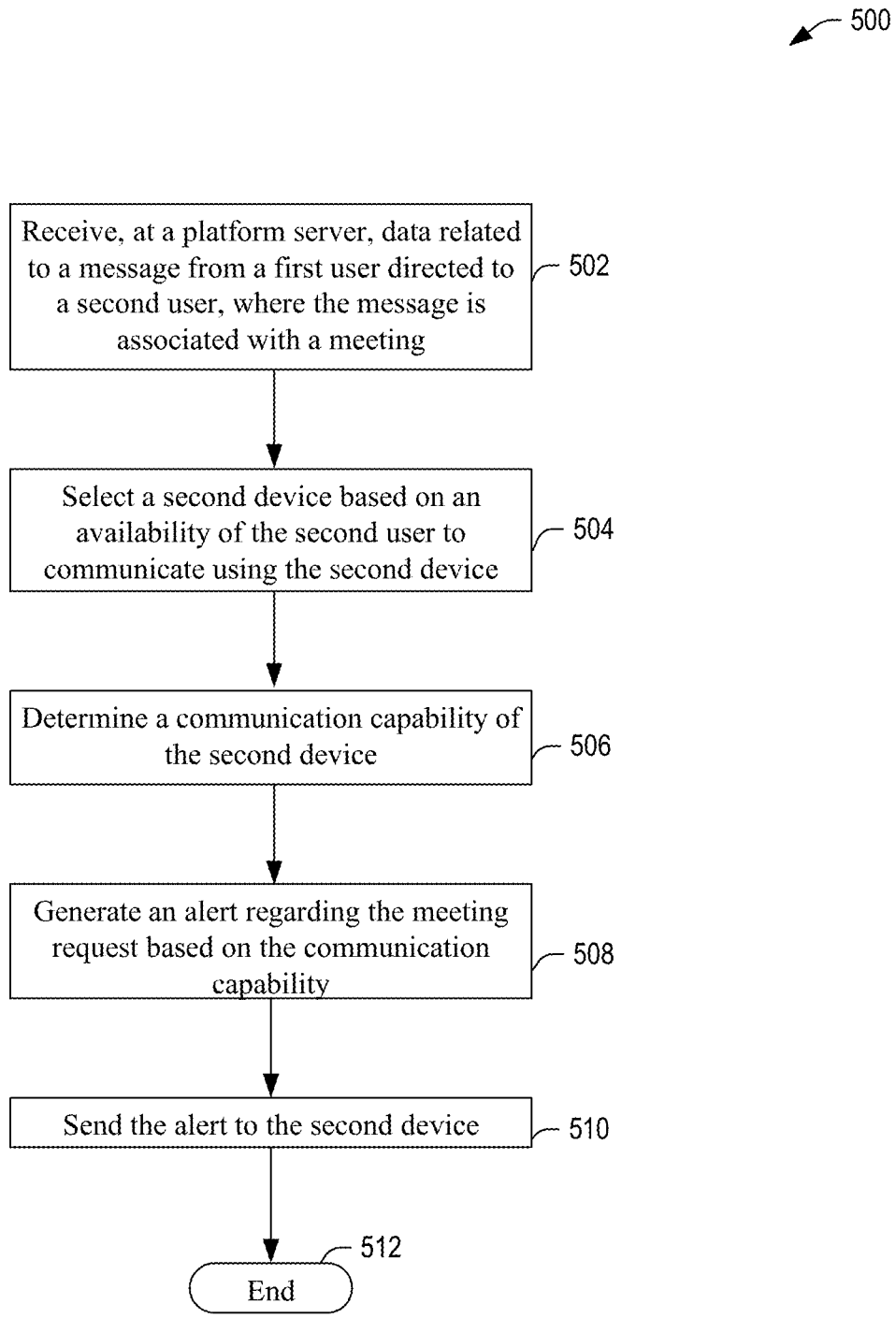
FIG. 5 is a flowchart to illustrate another particular embodiment of a method of managing a meeting invitation.

FIG. 5 is a flowchart to illustrate a particular embodiment of a method 500 of managing meetings. In an illustrative embodiment, the method 500 may be performed by the system 100 of FIG. 1 and may be performed in accordance with the embodiments illustrated in FIGS. 2-3.

The method 500 may include receiving, at a platform server, data related to a message from a first user directed to a second user, where the message is associated with a meeting, at 502. For example, in FIG. 1, the platform server 180 may receive the data 166 related to the message 164 from the first user 192 directed to the second user 194. The message 164 may be associated with a meeting. In a particular embodiment, the data may indicate the meeting identifier associated with the meeting. For example, in FIG. 1, the data 166 may include the meeting identifier 172.

The method 500 may further include selecting a second device based on an availability of the second user to communicate using the second device, at 504. For example, in FIG. 1, the user availability module 104 may determine that the second user 194 is available to communicate using the set-top box device 134 or the second mobile device 122. In a particular embodiment, the user availability module 104 may determine user availability based on the user device activity data 108, the user calendars 114, and/or the user profiles 112. For example, the user device activity data 108 may indicate that the second user 194 sent a text message from the second mobile device 122 less than 10 minutes ago and that the second mobile device 122 was at the home of second user 194 at that time. The user calendars 114 may indicate that the second user 194 is scheduled to watch a television program at a set-top box device at home starting in an hour at 3 PM and ending at 5 PM. The user profiles 112 may indicate that the second user 194 prefers using a set-top box device for participating in meetings from home and that the second user 194 is available for meetings while scheduled to watch television programs. Based on the user device activity data 108, the user calendars 114, and the user profiles 112, the user availability module 104 may determine that the user is available for a meeting via the set-top box device 134 until at least 5 PM.

The method 500 may also include determining a communication capability of the second device, at 506. For example, in FIG. 1, a user profile of the second user 194 stored in the user profiles 112 may indicate the communication capabilities of devices associated with the second user 194. For example, the user profiles 112 may indicate the communication capabilities of the second mobile device 122 (e.g., text messaging disabled) and of the set-top box device 134 (e.g., high definition video enabled, text messaging enabled). The data 166 may indicate the communication capabilities of the second mobile device 122 and of the set-top box device 134 (e.g., based on the user profiles 112). The communication module 182 may determine the communication capability of the second mobile device 122 and of the set-top box device 134 from the data 166. For example, the communication module 182 may determine that text messaging is disabled at the second mobile device 122 and that the set-top box device 134 is capable of displaying high definition video and capable of communicating via text messaging based on the data 166. In alternate embodiments, availability and capability determination may be performed, at least partially, by one or more other devices (e.g., a presence server, a registration server, a user database, etc.).

The method 500 may further include generating an alert regarding the meeting request based on the communication capability, at 508, and sending the alert to the second device, at 510. For example, in FIG. 1, the communication module 182 may generate and send the alert 168 to the second mobile device 122 and to the set-top box device 134. Based on the communication capability of the second mobile device 122, the alert 168 to the second mobile device 122 may be a ring tone and not a text message, while the alert 168 to the set-top box device 134 may be a text message (e.g., that is overlaid on top of video content displayed by the display device 136). In a particular embodiment, the alert 168 may include the meeting identifier. For example, in FIG. 1, the alert 168 to the set-top box device 134 and to the second mobile device 122 may include the meeting identifier 172. The method 500 may end, at 512.

Figure 6:
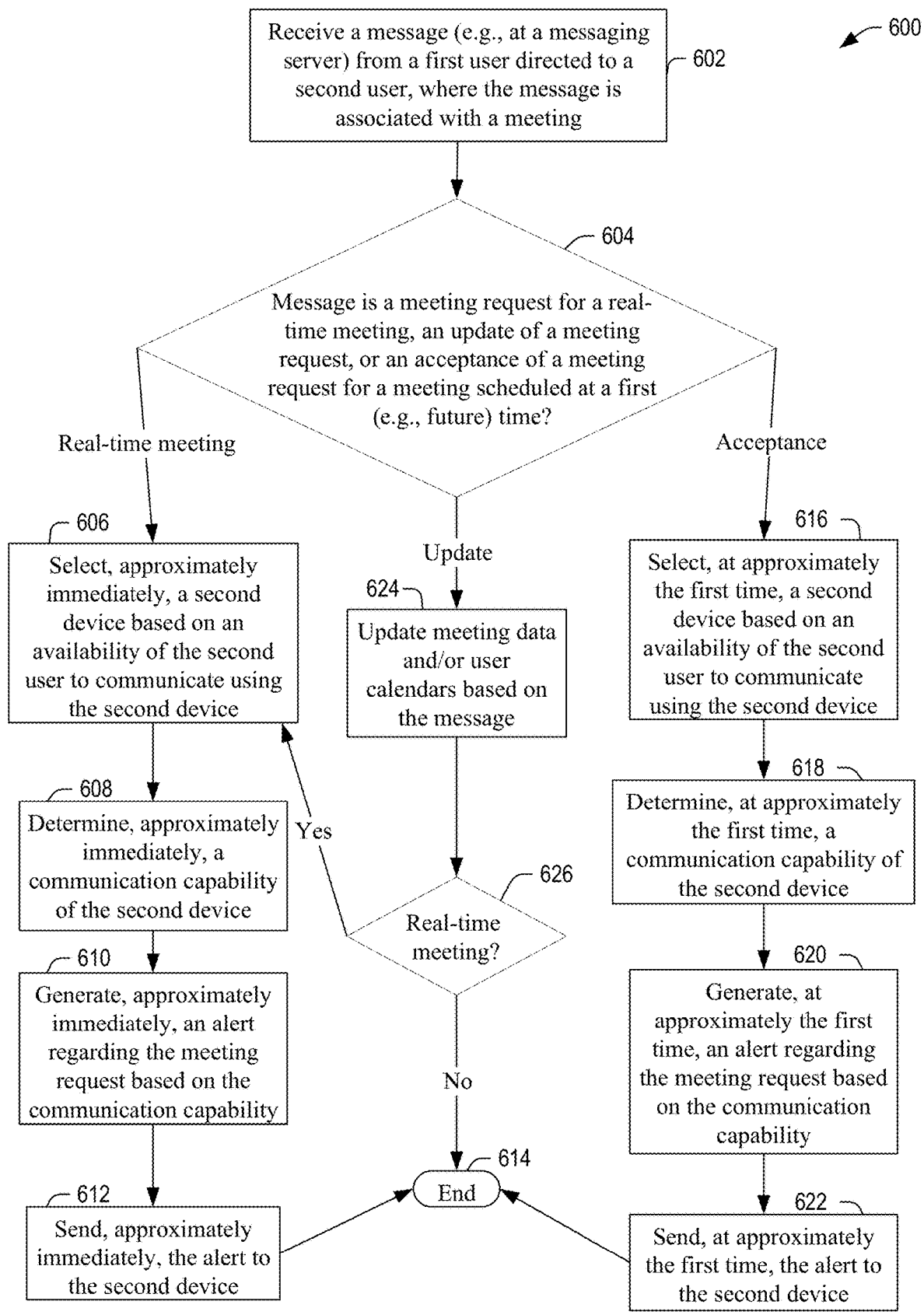
FIG. 6 is a flowchart to illustrate another particular embodiment of a method of managing a meeting invitation.

FIG. 6 is a flowchart to illustrate a particular embodiment of a method 600 of managing meetings. In an illustrative embodiment, the method 600 may be performed by the system 100 of FIG. 1 and may be performed in accordance with the embodiments illustrated in FIGS. 2-3.

The method 600 may include receiving a message from a first user directed to a second user, where the message is associated with a meeting, at 602. For example, in FIG. 1, the messaging module 102 may receive the message 164 from the first user 192 directed to the second user 194.

The method 600 may also include determining whether the message is a meeting request for a real-time meeting, an update of a meeting request, or an acceptance of a meeting request for a meeting scheduled at a first (e.g., future) time, at 604. For example, in FIG. 1, the messaging module 102 may determine whether the message 164 is a meeting request for a real-time meeting, an update of a meeting request, or an acceptance of a meeting request for a meeting scheduled at a first time (e.g., based on a keyword in a subject line of the message, a keyword in a header of the message, a field in the header of the message, a keyword in a body of the message, a mailbox that the message is addressed to, a meeting time indicated in the message, or a combination thereof).

In response to determining that the message is a meeting request for a real-time meeting, the method 600 may further include selecting, approximately immediately (e.g., without significant, or user-perceptible, intentional delay), a second device based on an availability of the second user to communicate using the second device, at 606. For example, in FIG. 1, the user availability module 104 may determine that the second user 194 is available to communicate using the set-top box device 134 or the second mobile device 122 (e.g., based on the user device activity data 108, the user calendars 114, and/or the user profiles 112).

The method 600 may also include determining, approximately immediately, a communication capability of the second device, at 608. For example, in FIG. 1, the communication module 182 may, immediately (or as soon as possible) upon receiving the data 166, determine a communication capability of the set-top box device 134 and the second mobile device 122 (e.g., based on the user profiles 112).

The method 600 may further include generating, approximately immediately, an alert regarding the meeting request based on the communication capability, at 610, and sending, approximately immediately, the alert to the second device, at 612. For example, in FIG. 1, the communication module 182 may, immediately (or as soon as possible) upon determining the communication capabilities of the set-top box device 134 and the second mobile device 122, generate and send the alert 168 to the set-top box device 134 and to the second mobile device 122. The method 600 may end, at 614.

In response to determining that the message is an update of a meeting request, the method 600 may include updating meeting data and/or user calendars based on the message, at 624. For example, in FIG. 1, the platform server 180 may update the meeting data 106 and/or the user calendars 114 when the message 164 indicates an update to a meeting request. For example, the meeting title, time, and/or invitees may be updated, or the meeting may be canceled.

The method 600 may further include determining whether the update turned the meeting into a real-time meeting, at 626. The method 600 may continue to 606 in response to determining that the meeting is a real-time meeting. If the meeting is not a real-time meeting, the method 600 may end, at 614.

In response to determining that the message is an acceptance of a meeting request scheduled at a first time, the method 600 may include selecting, at approximately the first time, a second device based on an availability of the second user to communicate using the second device, at 616. For example, in FIG. 1, the user availability module 104 may determine, at approximately the first time, that the second user 194 is available to communicate using the set-top box device 134 or the second mobile device 122 (e.g., based on the user device activity data 108, the user calendars 114, and/or the user profiles 112).

The method 600 may further include determining, at approximately the first time, a communication capability of the second device, at 618. For example, in FIG. 1, the communication module 182 may determine, approximately at the first time, a communication capability of the set-top box device 134 and the second mobile device 122 (e.g., based on the user profiles 112).

The method 600 may also include generating, at approximately the first time, an alert regarding the meeting request based on the communication capability, at 620, and sending, at approximately the first time, the alert to the second device, at 622. For example, in FIG. 1, the communication module 182 may, approximately at the first time, generate and send the alert 168 to the set-top box device 134 and to the second mobile device 122. The method 600 may end, at 614.

Figure 7:
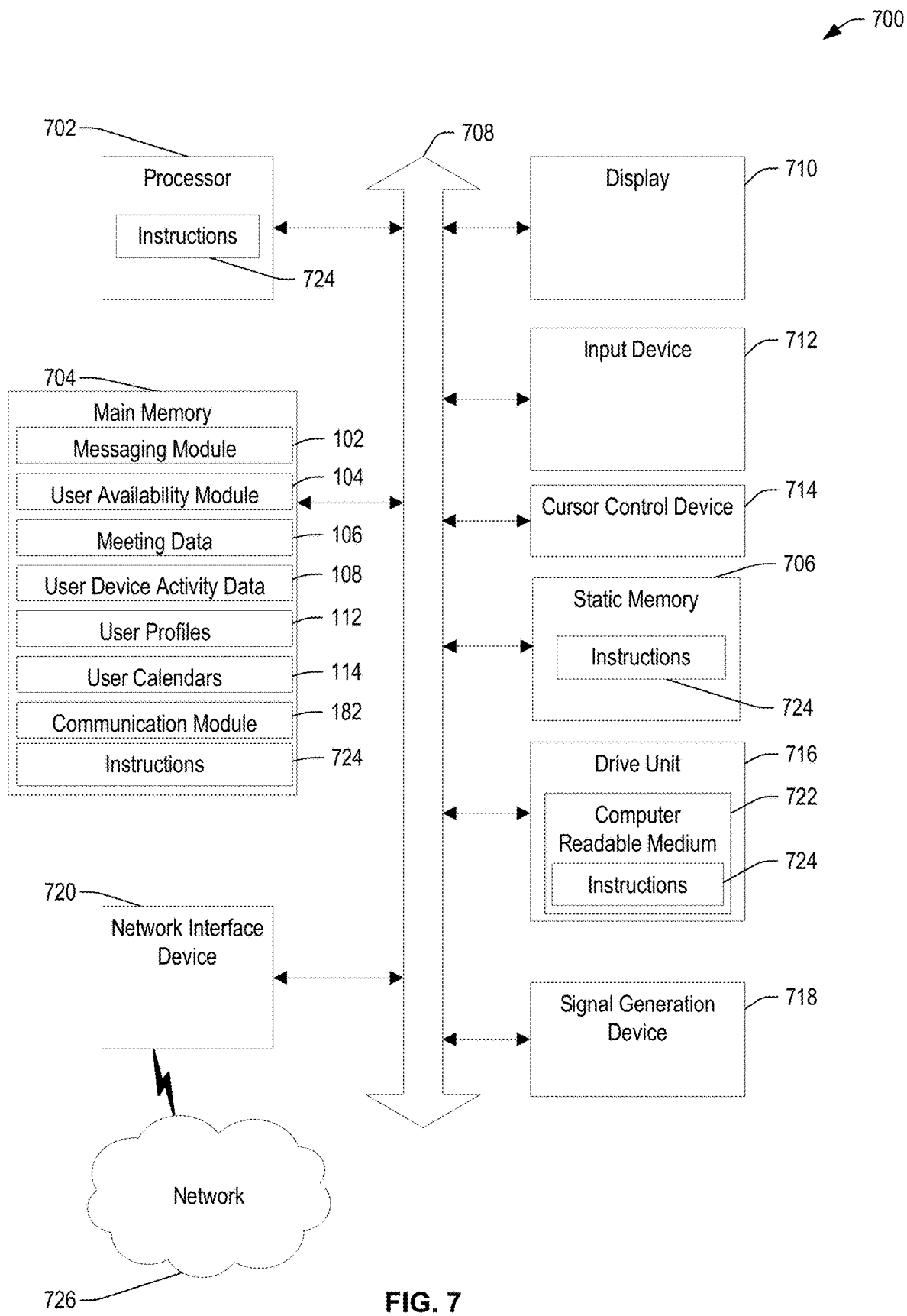
FIG. 7 is a block diagram of an illustrative embodiment of a general computer system operable to support embodiments of computer-implemented methods, computer program products, and system components as illustrated in FIGS. 1-6.

FIG. 7 is a block diagram illustrating an embodiment of a general computer system that is generally designated 700. The computer system 700 may be operable to support embodiments of computer-implemented methods, computer program products, and system components as illustrated in FIGS. 1-6. The computer system 700, or any portion thereof, may operate as a standalone device or may be connected, e.g., using a network, to other computer systems or peripheral devices.

In a networked deployment, the computer system 700 may operate in the capacity of a set-top box device, a personal computing device, a mobile computing device, a messaging server, a platform server, or some other computing device. The computer system 700 can also be implemented as or incorporated into various devices, such as a personal computer (PC), a tablet PC, a personal digital assistant (PDA), a mobile device, a palmtop computer, a laptop computer, a desktop computer, a server, a communications device, a web appliance, a television or other display device, or any other machine capable of executing a set of instructions (sequential or otherwise) that specify actions to be taken by that machine. In a particular embodiment, the computer system 700 can be implemented using electronic devices that provide voice, video, and/or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU). Moreover, the computer system 700 may include a main memory 704 and a static memory 706 that may communicate with each other via a bus 708. In a particular embodiment, the main memory 704 may include (e.g., as processor-executable instructions) the messaging module 102 of FIG. 1, the user availability module 104 of FIG. 1, the meeting data 106 of FIG. 1, the user device activity data 108 of FIG. 1, the user profiles 112 of FIG. 1, the user calendars 114 of FIG. 1, the communication module 182 of FIG. 1, or any combination thereof. As shown, the computer system 700 may further include or be coupled to a display unit 710, such as a liquid crystal display (LCD), an organic light emitting diode (OLED), a flat panel display, a solid-state display, or a projection display. Additionally, the computer system 700 may include an input device 712, such as a keyboard, a remote control device (e.g., the remote control device 138 of FIG. 1), and a cursor control device 714, such as a mouse. The computer system 700 may also include a disk drive unit 716, a signal generation device 718, such as a speaker, and a network interface device 720. The network interface device 720 may be coupled to other devices (not shown) via a network 726, such as the network 130 of FIG. 1.

One or more of the components of the computer system 700 may be included in a set-top box device (e.g. the set-top box device 134), a mobile device (e.g., the second mobile device 122 or the first mobile device 124), or a computing device (e.g., the computing device 162). In a particular embodiment, the set-top box device, the mobile device, or the computing device may include a tangible computer-readable medium in which one or more sets of instructions, e.g., software, may be embedded. Further, the instructions may be executable by a processor to perform one or more of the methods described herein.

In a particular embodiment, as depicted in FIG. 7, the disk drive unit 716 may include a tangible computer-readable medium 722 in which one or more sets of instructions 724, e.g. software, may be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable non-transitory medium that includes instructions 724 so that a device connected to the network 726 can communicate voice, video, or data over the network 726. Further, the instructions 724 may be transmitted or received over the network 726 via the network interface device 720 (e.g., via uploading and/or downloading of a meeting management application or program).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a messaging server from a first device associated with a first user, an update message to change a meeting from a first time to a second time, the update message directed to a second user; and
without receipt of a response to the update message from a device associated with the second user and in response to a threshold determination that a current time is less than a particular threshold time from the second time:
accessing, at the messaging server, user device activity data associated with the second user;
confirming, at the messaging server, based on the user device activity data, an availability of the second user;
identifying, at the messaging server, based on the user device activity data, a currently available device associated with the second user;
selecting, at the messaging server, a set of devices associated with the second user, wherein the set of devices identifies devices that satisfy a device capability needed to participate in the meeting and that are currently available for use, wherein the set of devices includes the currently available device associated with the second user; and
sending an alert regarding the meeting from the messaging server to each device of the set of devices;
wherein the threshold determination is a selection by the messaging server between sending the alert when the current time is less than the particular threshold time from the second time or waiting to receive the response when the current time is more than the particular threshold time from the second time, and further comprising updating an electronic calendar of the second user based on the update message.

2. The method of claim 1, wherein the meeting comprises a voice call, a video conference, a web-browser session, a chat session, a web communications session, or a combination thereof.

3. The method of claim 1, further comprising sending a message to devices of meeting participants joined to the meeting based on a received response to the alert, the received response indicating rejection of the meeting, wherein the message indicates that the second user declined the meeting.

4. The method of claim 1, wherein the selecting the set of devices associated with the second user is based on a user profile for the second user, the user profile including availability information and capability information for a particular device associated with the second user.

5. The method of claim 1, wherein the selecting the set of devices associated with the second user is based on scheduled activities included in an electronic calendar of the second user.

6. The method of claim 1, wherein the set of devices includes a media device located at a residence of the second user, a computer located at the residence, a personal mobile communication device, a work computer, a work mobile communication device, or combinations thereof.

7. The method of claim 1, wherein the alert sent to a first particular device of the set of devices includes an option to join the meeting.

8. The method of claim 1, further comprising rescinding the alert to a first particular device of the set of devices responsive to receipt of user input associated with the alert sent to a second particular device of the set of devices.

9. The method of claim 1, wherein the alert includes a uniform resource locator to join the meeting.

10. The method of claim 1, wherein the device capability includes a video capability.

11. A system comprising:
a processor; and
a memory coupled to the processor, the memory storing instructions executable by the processor to perform operations, the operations including:
receiving, from a first device associated with a first user, an update message to change a meeting from a first time to a second time, the update message directed to a second user; and
without receipt of a response to the update message from a device associated with the second user and responsive to a threshold determination that a current time is less than a particular threshold time from the second time:
accessing user device activity data associated with the second user;
confirming based on the user device activity data, an availability of the second user;
identifying based on the user device activity data, a currently available device associated with the second user;
selecting a set of devices associated with the second user, wherein the set of devices identifies devices that satisfy a device capability needed to participate in the meeting and that are currently available for use, wherein the set of devices includes the currently available device associated with the second user; and
sending an alert regarding the meeting to each device of the set of devices;
wherein the threshold determination is a selection by the system between sending the alert when the current time is less than the particular threshold time from the second time or waiting to receive the response when the current time is more than the particular threshold time from the second time, and further comprising updating an electronic calendar of the second user based on the update message.

12. The system of claim 11, wherein selecting the set of devices associated with the second user comprises including a particular device in the set of devices based on a first determination that the particular device is a media device, based on a second determination that the media device satisfies the device capability, and based on a third determination that the media device is currently in use.

13. The system of claim 11, wherein selecting the set of devices associated with the second user comprises including a particular device in the set of devices based on a first determination that the particular device is a mobile communication device, based on a second determination that the mobile communication device satisfies the device capability, and based on a third determination that the mobile communication device is not currently in use.

14. The system of claim 11, wherein the alert sent to a particular device of the set of devices comprises data to cause the particular device to generate a pop-up menu to a display device.

15. The system of claim 11, wherein the meeting comprises a voice call, a video conference, a web-browser session, a chat session, a web communications session, or a combination thereof.

16. A computer-readable storage device storing instructions that, when executed by a processor, cause the processor to perform operations, the operations comprising:
- receiving, from a first device associated with a first user, an update message to change a meeting from a first time to a second time, the update message directed to a second user; and
- without receipt of a response to the update message from a device associated with the second user and responsive to a threshold determination that a current time is less than a particular threshold time from the second time:
- accessing user device activity data associated with the second user;
- confirming based on the user device activity data, an availability of the second user;
- identifying based on the user device activity data, a currently available device associated with the second user;
- selecting a set of devices associated with the second user, wherein the set of devices identifies devices that satisfy a device capability needed to participate in the meeting and that are currently available for use, wherein the set of devices includes the currently available device associated with the second user; and
- sending an alert regarding the meeting to each device of the set of devices;
- wherein the threshold determination is a selection by the processor between sending the alert when the current time is less than the particular threshold time from the second time or waiting to receive the response when the current time is more than the particular threshold time from the second time, and further comprising updating an electronic calendar of the second user based on the update message.

17. The computer-readable storage device of claim 16, wherein the operations further comprise sending a message to devices of meeting participants joined to the meeting based on not receiving a response to the alert, wherein the message indicates that the second user has not accepted or declined the meeting.

18. The computer-readable storage device of claim 16, wherein the operations further comprise updating an electronic calendar of the second user based on the update message.

19. The computer-readable storage device of claim 16, wherein the alert sent to a particular device comprises a session initiation protocol invite message.

20. The computer-readable storage device of claim 16, wherein the alert includes a first prompt for first user input to accept the meeting and a second prompt for second user input to decline the meeting.

\* \* \* \* \*